United States Patent
Ren et al.

(10) Patent No.: US 8,679,445 B1
(45) Date of Patent: Mar. 25, 2014

(54) SYNTHESIS OF CSSNI$_3$ BY TEMPERATURE GRADIENT SOLID-PHASE SINTERING METHOD

(71) Applicant: Sun Harmonics Ltd., Hangzhou (CN)

(72) Inventors: Yuhang Ren, Secaucus, NJ (US); Jin Zhang, Hangzhou (CN); Yizhi Li, Hangzhou (CN); Kai Shum, Orefield, PA (US)

(73) Assignee: Sun Harmonics Ltd., Hangzhou (CN)

(\*) Notice: Subject to any disclaimer, the term of this patent is extended or adjusted under 35 U.S.C. 154(b) by 0 days.

(21) Appl. No.: 14/079,807

(22) Filed: Nov. 14, 2013

(51) Int. Cl.
   *C01B 9/06* (2006.01)
(52) U.S. Cl.
   USPC ............. 423/463; 252/301.4 F; 252/301.4 H; 252/501.1; 252/520.1
(58) Field of Classification Search
   CPC .. H01L 31/18; C01G 19/006; C09K 11/0833; C09K 11/616; C09C 2210/50
   USPC .......... 423/463; 252/301.4 F, 301.4 H, 520.1, 252/501.1
   See application file for complete search history.

(56) References Cited

U.S. PATENT DOCUMENTS

| | | | |
|---|---|---|---|
| 7,641,815 B2 \* | 1/2010 | Varadarajan et al. | .. 252/301.4 H |
| 2008/0038494 A1 | 2/2008 | Midgley | |
| 2010/0055350 A1 | 3/2010 | Pfenninger | |
| 2011/0180757 A1 \* | 7/2011 | Vockic et al. | ........... 252/301.4 F |
| 2012/0305918 A1 | 12/2012 | Shum | |
| 2013/0139872 A1 \* | 6/2013 | Shum et al. | .................... 136/252 |

OTHER PUBLICATIONS

Yamada et al. "Structure Phase Transitions of the Polymorphs of CsSnI3 by Means of Rietveld Analysis of the X-ray Diffraction", Chemistry Letters, 1991, 20, pp. 801-804.\*
Scaife et al. "Crystal Preparation and Properties of Cesium Tin(II) Trihalides", Journal or Solid State Chemistry 9, 308-314, 1974.\*
Chung et al. "CsSnI3: Semiconductor or Metal? High Electrical Conductivity and Strong Near-Infrared Photoluminescence from a Single Material. High Hole Mobility and Phase Transitions", Journal of the American Chemical Society, 2012, 134, pp. 8579-8587.\*
Shum et al. "Synthesis and Characterization of CsSnI3 thin films", Applied Physics Letters, 96, 221903 (2010).\*
Suib et al "Gel Growth of Single Crystals of some Rubidium and Cesium Tin Halides", Journal of Crystal Growth 48 (1980) 155-160.\*
Triply Resonant Raman Scattering in Perovskite Semiconductor CsSnI3; Chonglong Yu, Zhuo Chena, Kai Shum; http://www.readcube.com/articles/10.1002/jrs.4180, Aug. 7, 2012.

\* cited by examiner

*Primary Examiner* — Ngoc-Yen Nguyen
(74) *Attorney, Agent, or Firm* — Lackenbach Siegel, LLP; Myron Greenspan

(57) ABSTRACT

This invention discloses a solid-based synthesis of cesium tin tri-iodide (CsSnI$_3$). More specifically, the CsSnI$_3$ is fabricated in a 3 zone high temperature resisting tube by the solid-phase sintering method. CsSnI$_3$ are ideally suited for a wide range of applications such as light emitting and photovoltaic devices.

11 Claims, 4 Drawing Sheets

Temperature zone 1
above 450°C
CsI and SnI$_2$ mixed powder

Temperature zone 2
under 450°C, above 320°C
SnI$_2$ vapor

Temperature zone 3
under 320°C
Evaporated SnI$_2$ (a)

(b)

SYNTHESIS OF CSSNI₃ BY TEMPERATURE GRADIENT SOLID-PHASE SINTERING METHOD

BACKGROUND OF THE INVENTION

1. Field of the Invention

The invention generally relates to photovoltaic technologies and, more specifically, to a method of synthesizing $CsSnI_3$, especially in large scale.

2. Description of the Prior Art

The current photovoltaic technologies can be classified by the ten different materials used for the light absorption in a solar cell. These materials include amorphous and polycrystalline silicon, CdTe, $CuIn,Ga_{1-x}Se_2$ (CIGS), GaAs, and photosensitive organic dyes. A transformative technology may emerge when a new and better material is discovered for photovoltaic applications.

$CsSnI_3$ is a unique phase-change material that exhibits four polymorphs. [1, 2] The black polymorph of $CsSnI_3$ could be obtained through a phase transition from the yellow polymorph $CsSnI_3$ by increasing its temperature above 425 K. It was further demonstrated by differential thermal analysis and X-ray diffraction that during the cooling of the black $CsSnI_3$ from 450 K, its ideal cubic perovskite structure (B-α) deformed to a tetragonal structure (B-β) at 426 K, and became an orthorhombic structure (B-γ) below 351 K. [3] The $CsSnI_3$ is unique in combining two generally contra-indicated properties, strong photoluminescence (PL) and high electrical conductivity. [4, 5]

A need still exists in the industry for developing synthesis methods for $CsSnI_3$, especially in large scale. The successful implementation of these materials for various applications requires a detailed understanding of both their processing and material properties.

BRIEF SUMMARY OF THE INVENTION

This invention is directed to the synthesis of cesium tin tri-iodide ($CsSnI_3$) by a solid-phase sintering method.

According to one embodiment of the invention the process of forming $CsSnI_3$ in a high temperature healing unit, comprises steps of:
 providing a 3 zone high temperature resistant heating unit;
 providing CsI powder;
 providing $SnI_2$ powder;
 mixing CsI and $SnI_2$ powders;
 vacuum pumping to create a vacuum and sealing the mixed powder in a side or end zone of the heating unit; and
 heating the end zone containing the mixed powder in the heating unit to form $CsSnI_3$.

Yet, another embodiment of this invention is directed to synthesizing $CsSnI_3$ by any one of the processes disclosed above.

In the process, the CsI and $SnI_2$ powders, which are preferably milled, are mixed in a protective environment of $N_2$ gas; the molar ratio of the $SnI_2$ and CsI in the mixture is from about 1/1 to 5/1.

The length of the 3 zone heating unit depends on the dimension of the heating chamber of the furnace. The material forming the 3 zone heating unit can be quartz, Pyrex, ceramics or metals.

The degree of vacuum in the 3 zone heating unit is from about $10^{-5}$ to $10^{-2}$ Pa.

BRIEF DESCRIPTION OF SEVERAL VIEWS OF THE FIGURES

While the specification concludes with claims particularly pointing out and distinctly claiming that which is regarded as the present invention, advantages of this invention may be more readily ascertained from the following description of the invention when read in conjunction with the accompanying drawings in which:

DETAILED DESCRIPTION

The $CsSnI_3$ exhibits outstanding optical, electrical, and ferro electric properties. These features make $CsSnI_3$ ideally suited for a wide range of applications such as light emitting and photovoltaic devices.

More specifically, $CsSnI_3$ is a promising material in the application of solar cells, since $CsSnI_3$ was found to possess a direct band gap of 1.32 eV at room temperature, right in the narrow region of optimal band gaps for the Shockley-Queisser maximum efficiency limit of a solar cell.

An effective method of synthesizing large domain size high quality Perovskite semiconductor are disclosed in the present invention.

Figure 1:
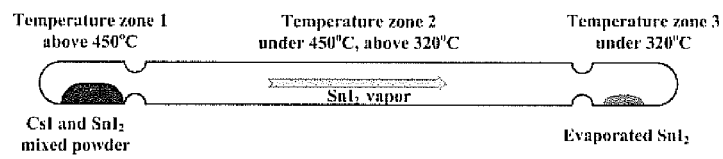
FIG. 1 shows the schematic diagram of synthesizing $CsSnI_3$ in accordance with the invention.

More specifically, a solid-phase sintering method to synthesize $CsSnI_3$ is disclosed in the present invention. The $CsSnI_3$ can be fabricated in a 3 zone heating unit, such as a high temperature resistant tube, by the solid-phase sintering method as shown in FIG. 1. This synthesis method of the $CsSnI_3$ further enhances the likelihood of using $CsSnI_3$ as a new absorption material for solar cells.

EXAMPLES

The procedures of synthesizing polycrystalline $CsSnI_3$ using reaction raw materials include mixing and filling the raw materials in a 3 zone heating unit such as a high temperature resistant tube under a protective environment of $N_2$ gas under ambient conditions.

The ambient conditions refer to: room temperature or temperature of 298.15 K (or 25 ° C., 77 F.); and an absolute pressure of 100 kPa (or 14.504 psi, 0.986 atm).

I. Example 1

Preparation of CsI and $SnI_2$ Mixed Powder 13 gram of CsI (99.999% purity) powder was placed in an agate mortar and milled for 1 hour. 19 grams of $SnI_2$ (99% purity) powder was placed in an agate mortar and milled for 1 hour. The milled CsI and $SnI_2$ powders were then placed in a container to mix and stir the powder for 30 minutes to insure homogeneity of the mixture.

The molar ratio of the $SnI_2$ and CsI in the mixture is from about 1/1 to 5/1.

II. Example 2

Figure 2:
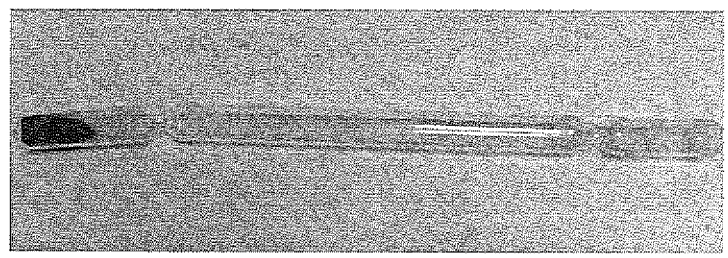
FIG. 2(a) shows a 3 zone heating unit in the form of a quartz tube filled with CsI and $SnI_2$ powders before sintering and, in FIG. 2(b), after sintering.
Figure 2:
Figure 2:
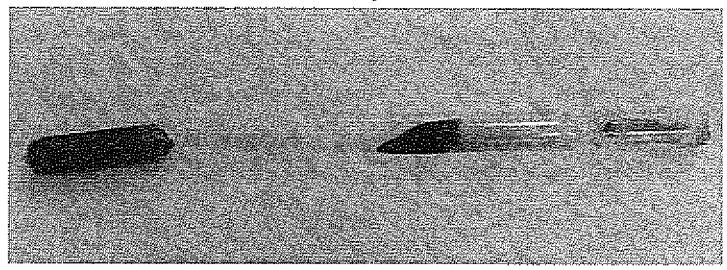

Vacuum Pumping and Sealing Mixed Powder in a Side Zone of the Tube 4 gram of mixed powder was placed at one end or at one end zone of a heating unit, shown by way of example to be a 3 zone high temperature resistant tube as shown in FIG. 2(a). Then the tube was pumped to create a vacuum by using a conventional vacuum system, and the tube was sealed by using CO gas fire equipment. The length of the 3 zone tube depends on the dimension or length of the heating chamber of the furnace. The material of the 3 zone tube can be formed of quartz, Pyrex, ceramic or metal. The degree of vacuum of the 3 zone tube is from about $10^{-5}$ to $10^{-2}$ Pa.

III. Example 3

Sintering to Form $CsSnI_3$

The sealed tube was placed in a tube furnace. The temperature of the reaction zone must be maintained above 450° C., the temperature of the middle zone may be maintained between 320 and 450° C., and the temperature of the last zone or other end is preferably maintained under 320° C. as shown in FIG. 1, a temperature gradient being maintained from one to the other of the opposing zones.

The mixed powder reacted to form black $CsSnI_3$ in the reaction zone when the temperature increased above 450° C., and a small amount of $SnI_2$ vapor was transported to the last or other end zone (right end as viewed in FIG. 1) of the tube and re-crystallized as shown in FIG. 2(b).

The chemical reaction for the mixed powder could be described as the following:

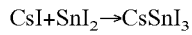

$CsI + SnI_2 \rightarrow CsSnI_3$

Figure 3:
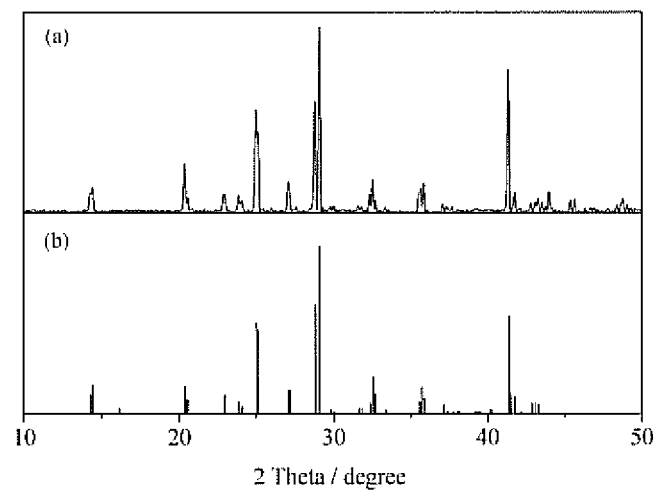
FIG. 3(a) shows the X-ray diffraction data (XRD) profile taken from $CsSnI_3$ (synthesized by CsI and $SnI_2$ powder) and FIG. 3(b) shows the standard XRD pdf card (43-1162) of black-δ phase of $CsSnI_3$.

The reaction was verified by identifying the end products of $CsSnI_3$ using the X-ray diffraction (XRD) data. XRD data was used not only to further verify the crystal structure of $CsSnI_3$ but importantly also to identify the side products of this reaction (as shown in the reaction). FIG. 3(a) showed the XRD data profile taken from $CsSnI_3$ (synthesized by CsI and $SnI_2$ powder). FIG. 3(b) showed the standard XRD pdf card (43-1162) of black-δ phase of $CsSnI_3$. All the measured peaks were well matched to the black-δ phase of $CsSnI_3$.

Figure 4:
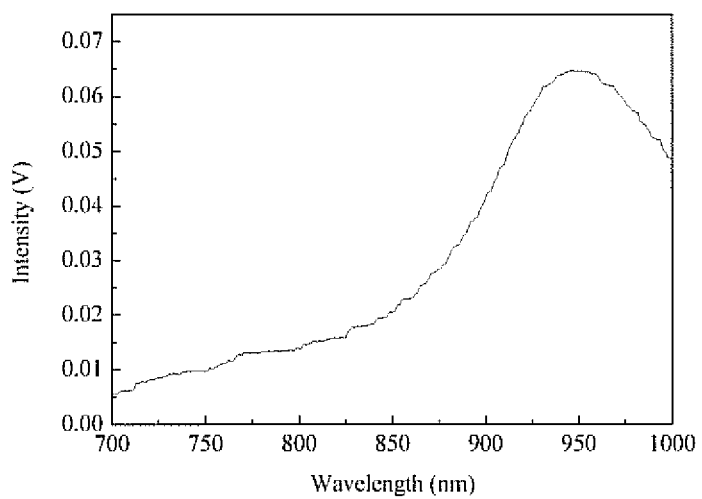
FIG. 4 shows the photoluminescence (PL) characteristics of $CsSnI_3$ powder.

Photoluminescence characteristics or properties of $CsSnI_3$ powder is shown in FIG. 4. It can be seen that the characteristic peak at 950 nm belongs to the black-δ phase of $CsSnI_3$.

In summary, $CsSnI_3$ in powder or bulk form was synthesized using CsI and $SnI_2$ powders by using a solid-phase sintering method.

A solid-phase sintering method was employed to fabricate $CsSnI_3$ in powder or bulk form, especially suitable for mass production of $CsSnI_3$ for solar cell applications. The polycrystalline quality of the resulting powder or bulk form was confirmed by being characterized by the XRD data.

The method in accordance with the invention assures efficient production of $CsSnI_3$ in powder or bulk form without the impurities associated with the prior art methods. Also, the method allows recycling of unused $SnI_2$ powder further decreasing the cost of production.

While the invention has been described in detail and with reference to specific examples and the embodiments thereof, it will be apparent to one skilled in the art that various changes and modifications can be made therein without departing from the spirit and scope thereof.

The invention claimed is:

1. A process of forming $CsSnI_3$ in a high temperature resistant tube, comprising the steps of:
   (1) providing a 3 zone high temperature heating unit having first and second end or opposing zones and a third intermediate portion or zone;
   (2) providing CsI powder;
   (3) providing $SnI_2$ powder;
   (4) mixing said CsI and $SnI_2$ powders to provide a mixture wherein the molar ratio of the $SnI_2$ and CsI in the mixture is selected to be in the range from about 1/1 to 5/1;
   (5) creating a vacuum within said heating unit and sealing the mixed powder in said first zone of said heating unit;
   (6) placing said heating unit into a heating chamber of a furnace and heating said first zone of said heating unit at a temperature maintained above 450° C. to form black $CsSnI_3$; and
   (7) collecting evaporated $SnI_2$ in said second zone of said heating unit.

2. The process of claim 1, wherein the process steps (2) to (4) are performed under a protective environment of $N_2$ gas under ambient conditions.

3. The process of claim 2, wherein the length of said heating unit is selected to correspond to the length of the heating chamber of the furnace.

4. The process of claim 3, wherein the material of said heating unit comprises a material selected from the group consisting of quartz, Pyrex, ceramics and metals.

5. The process of claim 4, wherein the degree of vacuum of said 3 zone heating unit is selected to be in the range from about $10^{-5}$ to $10^{-2}$ Pa.

6. The process of claim 1, wherein said heating unit comprises a temperature resistant tube formed of a material selected from the group consisting of quartz, Pyrex, ceramics and metals.

7. The process of claim 5, wherein the temperature of said third intermediate zone is maintained between 320 and 450° C.

8. The process of claim 7, wherein the temperature of said second zone maintained under 320° C.

9. The process of claim 1, wherein the $CsSnI_3$ is formed by using a solid-phase sintering method.

10. The process of claim 1, wherein a temperature gradient is maintained between said first and second opposing zones.

11. The process of claim 10, wherein said temperature gradient varies from above 450° C. at said first zone to a temperature below 320° C. at said second zone.

* * * * *